United States Patent [19]
Carlson et al.

[11] Patent Number: 5,311,524
[45] Date of Patent: May 10, 1994

[54] FAULT TOLERANT THREE PORT COMMUNICATIONS MODULE

[75] Inventors: Lewis R. Carlson; John J. Carver, II, both of Salt Lake City, Utah

[73] Assignee: Unisys Corporation, Blue Bell, Pa.

[21] Appl. No.: 936,812

[22] Filed: Aug. 27, 1992

[51] Int. Cl.⁵ .............................................. H04L 1/08
[52] U.S. Cl. .................................................... 371/70
[58] Field of Search ........................ 371/70, 60, 61, 55, 371/57.1; 364/246.8, 244.8, 249.1, 265, 221, 222.2, 230, 230.3, 229, 229.4, 259.6, 260, 261.1, 284.4, 919

[56] References Cited

U.S. PATENT DOCUMENTS

| | | | |
|---|---|---|---|
| 3,961,203 | 6/1976 | Hutch | 371/55 |
| 4,308,579 | 12/1981 | Dlugos | 371/70 |
| 4,434,499 | 2/1984 | Motsch et al. | 371/70 |
| 4,866,609 | 9/1989 | Calta et al. | 395/250 |

*Primary Examiner*—Robert W. Beausoliel, Jr.
*Assistant Examiner*—Trinh Tu
*Attorney, Agent, or Firm*—Charles J. Fassbender; Mark T. Starr

[57] ABSTRACT

A fault tolerant three port communications module has two control ports for receiving commands from two computers, and a communications port for transferring data over a communications channel in response to the commands. Each control port includes a select line which carries a select signal with true and false states, mode lines which carry codes that represent the commands, and a write line which carries a respective pulse in sync with each of the codes. The select line, mode lines, and write line of each control port are coupled in the module to a respective inter-processor command decoder having a lead stage and a trail stage. The lead stage detects when a predetermined code occurs on the mode lines and the select signal is false during a first one of the pulses; and, the trail stage generates an output signal that indicates the receipt of an inter-processor command for the module if, during a second pulse that immediately follows the first pulse, the compliment of the predetermined code occurs on the mode lines and the select line is true.

9 Claims, 4 Drawing Sheets

FAULT TOLERANT THREE PORT COMMUNICATIONS MODULE

BACKGROUND OF THE INVENTION

This invention relates to the structure and operation of communication modules which have two control ports that are coupled to respective computers, and one communications port that is coupled to a communications channel.

With such a communications module, each of the computers can send an intra-processor command to a respective control port which initiates some action in the communication module that directly effects the computer which sent the intra-processor command. Also, each of the computers can send an inter-processor command to a respective control port which initiates some action in the communication module that directly affects the other computer which did not send the command.

For example, one intra-processor command can initiate the passage of data from the communications channel through the module to the computer which sent the command. By comparison, an inter-processor command to the communication module can stop the passage of data between the communications channel and the computer which did not send the command.

Since an inter-processor command from one processor directly affects the other processor, it is very desirable to have some sort of security built into the communications module whereby any erroneously generated inter-processor commands are detected and the corresponding operations are inhibited from being carried out. Otherwise, if a processor has a certain fault which causes it to erroneously send bogus inter-processor commands, the effect on the other processor can be disastrous.

Accordingly, a primary object of the invention is to provide a three port communications module which is immune from inter-processor commands that are sent due to certain types of faults.

BRIEF SUMMARY OF THE INVENTION

With the present invention, the above object and others, are achieved by a three port communications module which has the following structure: a) two control ports for receiving commands from two computers, and a communications port for transferring data over a communications channel in response to the commands; b) each control port includes a select line which carries a select signal with true and false states, mode lines which carry codes that represent the commands, and a write line which carries a respective pulse in sync with each of the codes; c) the select line, mode lines, and write line of each control port are coupled in the module to a respective inter-processor command decoder having a lead stage and a trail stage; d) the lead stage detects when a predetermined code occurs on the mode lines and the select signal is false during a first one of the pulses; and, e) the trail stage generates an output signal that indicates the receipt of an inter-processor command for the module if, during a second pulse that immediately follows the first pulse, the compliment of the predetermined code occurs on the mode lines and the select line is true.

If a fault occurs which causes the signal on any of the mode lines to be stuck in a "1" or a "0" state, then with the above communications module it is impossible to receive an inter-processor command. This is because each inter-processor command is indicated by a predetermined code followed immediately by its compliment. Similarly, if a fault occurs which causes the select signal to be stuck in a "1" or a "0" state, then with the above communications module it also is impossible to receive an inter-processor command. This fault tolerance is important because it prevents one processor from issuing bogus inter-processor commands which could have disastrous effects on the other processor.

BRIEF DESCRIPTION OF THE DRAWINGS

Various preferred embodiments of the invention are described herein in conjunction with the accompanying drawings wherein.

DETAILED DESCRIPTION

Figure 1:
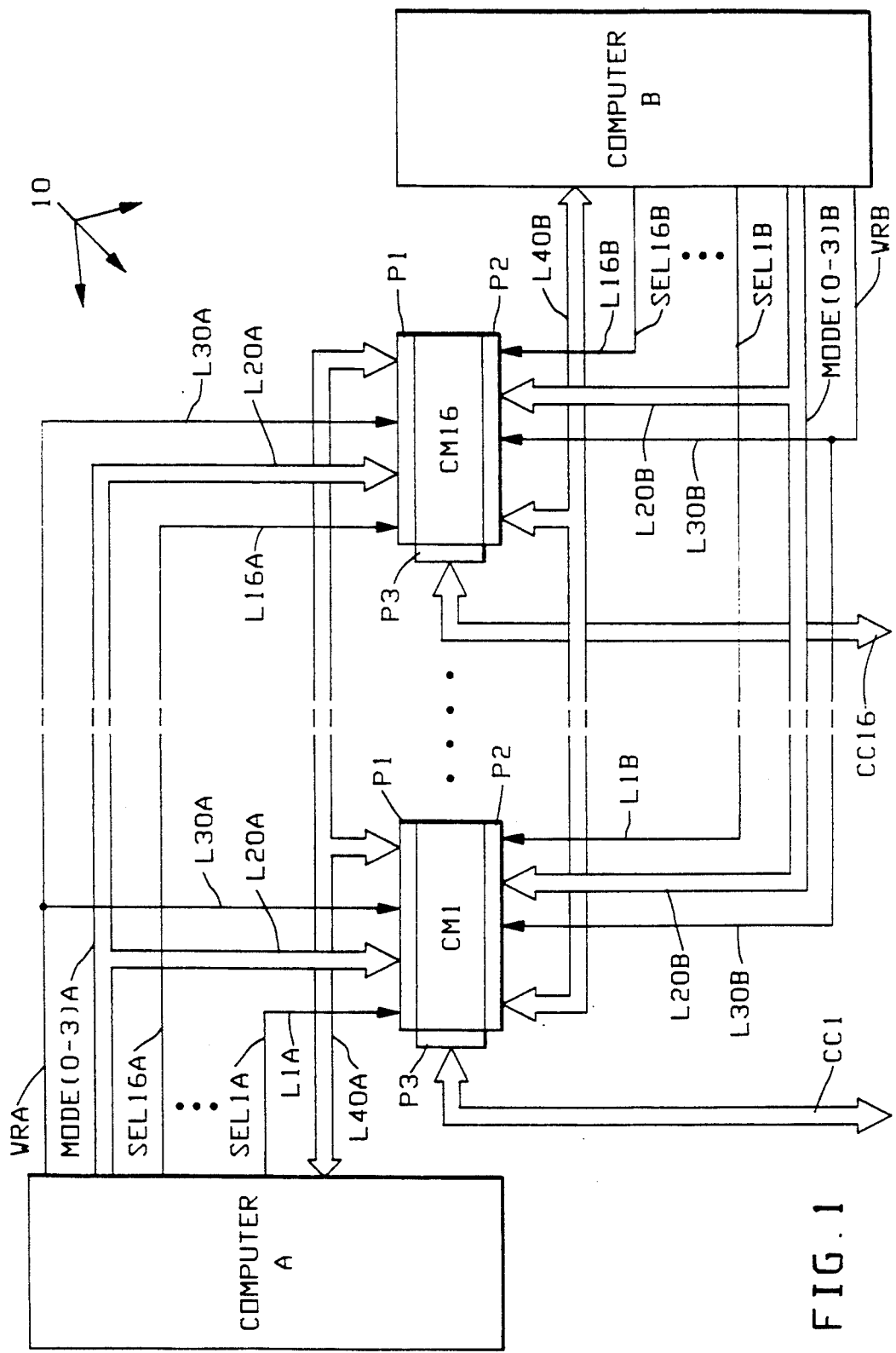
FIG. 1 shows a computer system that includes several communication modules each of which is structured in accordance with the present invention.

Referring now to FIG. 1, it shows a computer system 10 that includes sixteen communication modules CM1-CM16 which are structured and operate in accordance with the present invention. Each of these communication modules CM1-CM16 has two separate control ports P1 and P2 which are identical to each other and which are respectively coupled to two computers A and B. Also, each of the communication modules CM1-CM16 has a communications port P3 which is coupled to a respective communications channel CC1-CC16.

In operation, the communication modules CM1-CM16 receive various commands from the computers A and B over the control ports P1 and P2. Some of these commands are intra-processor commands which direct a communication module to take some predetermined action on the control port which received the command. For example, an intra-processor command that is received on one control port can direct a communication module to pass data from a communication channel to the computer which sent the command. In addition, some of the commands are inter-processor commands which direct a communication module to take some predetermined action on the control port that is opposite to the one that received the command. For example, an inter-processor command that is received on one control port can stop the passage of data through the opposite control port.

To enable computer A to send the above commands to the communication modules, port P1 includes the following signal lines: a separate select line L1A-L16A for each of the communication modules CM1-CM16 respectively, and four mode lines L20A plus one write line L30A which go to all of the modules. Similarly, port P2 includes a separate select line L1B-L16B for each of the communication modules CM1-CM16 respectively, and four mode lines L20B plus one write line L30B which go to all of the communication modules. Actual data transfer between a communication module and one of the computers A or B occurs over one of the data buses 40A or 40B, respectively.

When computer A sends an intra-processor command to the ith communication module (where "i" equals 1, or 2, or 3, etc.) the signal sequence is as follows. First computer A generates a true select signal SELiA on the ith select line LiA and it generates a false select signal on the remaining select lines. Also, computer A generates a four bit code on the mode lines L20A which represents the command for the ith communication module. Then computer A sends a pulse WRA on the write line L30A. Only the ith communication module accepts the command since only that module has a true select signal SELiA. In the same fashion, Computer B utilizes the select lines L1B-L16B, mode lines L20B, and write line L30B to send an intra-processor command to a communication module.

By comparison, when computer A sends an inter-processor command to the ith communication module, a different signal sequence is used. That different signal sequence for computer A is shown in detail in FIG. 2. A similar signal sequence on Port P2 is used by Computer B when it sends an inter-processor command.

Figure 2:
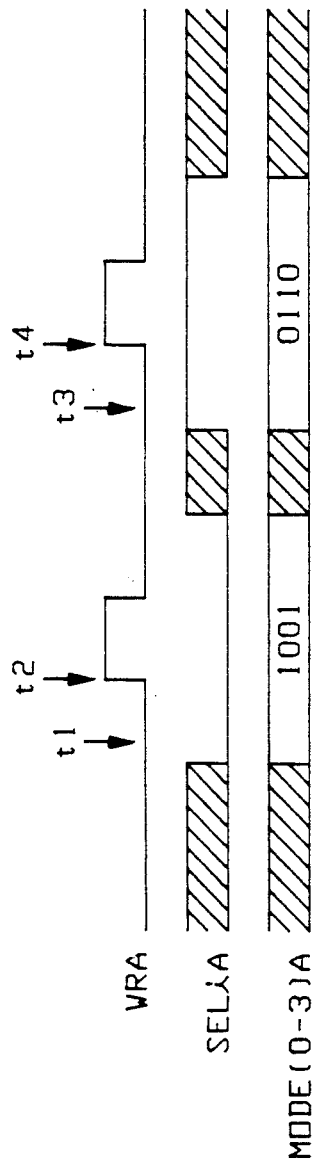
FIG. 2 shows a signal sequence whereby an inter-processor command is sent in FIG. 1 from a computer to a communication module.

Initially, at time t1 in FIG. 2, computer A sends false select signals SEL1A-SEL16A on all of the select lines L1A-L16A; and simultaneously, computer A places a particular code on the mode lines L20A. Then, at time t2, computer A generates a write pulse WRA on the write line 30A. Next, at time t3, computer A changes the code that was on the mode lines at time t2 to the compliment of that code; and in addition, it generates a true select signal SELiA on the ith select line LiA. Then, to complete the signal sequence, computer A generates a write pulse WRA at time t4 on the write line L30A.

Due to the above described signal sequence, the computer system of FIG. 1 is able to tolerate certain faults. In particular, if a fault occurs which causes the signal on any of the mode lines to be stuck in a "1" or a "0 state", then it is impossible to send an inter-processor command to any communication module. Similarly, if a fault occurs which causes the ith select signal SELiA to be stuck in a "1" or a "0" state, then it is impossible to send an inter-processor command to the ith communications module. This fault tolerance is important because it prevents one processor from issuing bogus inter-processor commands which could have disastrous effects on the other processor.

Figure 3:
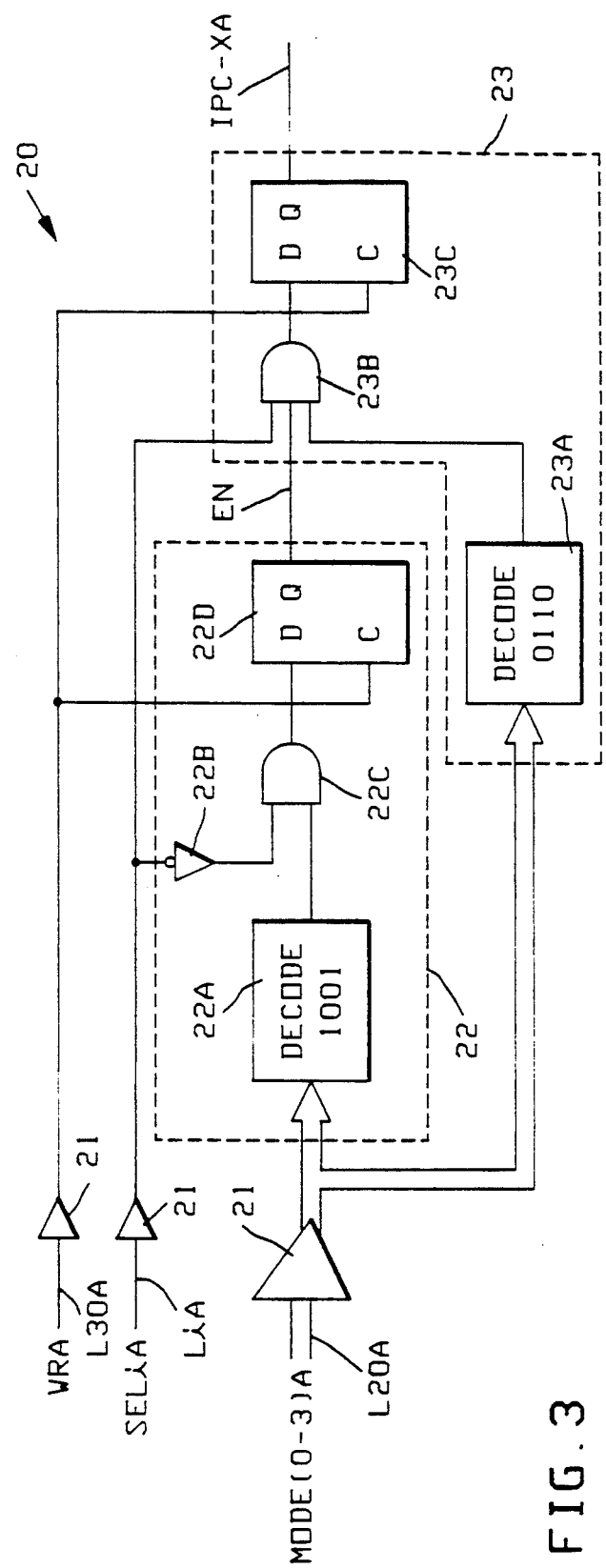
FIG. 3 is a detailed logic diagram of a command decoder the FIG. 1 communications module which decodes inter-processor commands via the signal sequence of FIG. 2.

Turning now to FIG. 3, it shows the circuit details of one preferred embodiment of a two stage command decoder 20 which is included in each of the control ports P1 and P2 of each of the communication modules and which operates to detect the receipt of an inter-processor command. This command decoder 20 consists of a set of receivers 21, a lead stage 22, and a trail stage 23. Stage 22 includes a logic circuit 22A, an inverter 22B, an AND gate 22C, and a triggerable D flip-flop 22D; and, stage 23 includes a logic circuit 23A, an AND gate 23B, and a D type triggerable flip-flop 23C. All of these components 21, 22A-22D, and 23A-23C are interconnected as shown; and, the input signals to the receivers 21 are shown, as an example, as WRA, SELiA, MODE(0-3)A. These are the input signals for control port P1 on the ith communication module.

In operation, components 22A, 22B, and 22C examine the four mode signals MODE(0-3)A and the ith select signal SELiA from the receivers 21 during the time instants t1 and t2. If the ith select signal is "0" and the four mode signals equal particular predetermined code (e.g. 1001) at time instant t2, then flip-flop 22D sets and generates a true enable signal EN. By comparison, components 23A and 23B detect the compliment of that same predetermined code (e.g. 0110) and the "1" state of the ith select signal SELiA during time instants t3 and t4. If those signal states exist and the enable signal EN is true at time instant t4, then flip-flop 23C sets; and its output signal IPC-XA indicates the receipt of an inter-processor command "X" from computer A.

Figure 4:
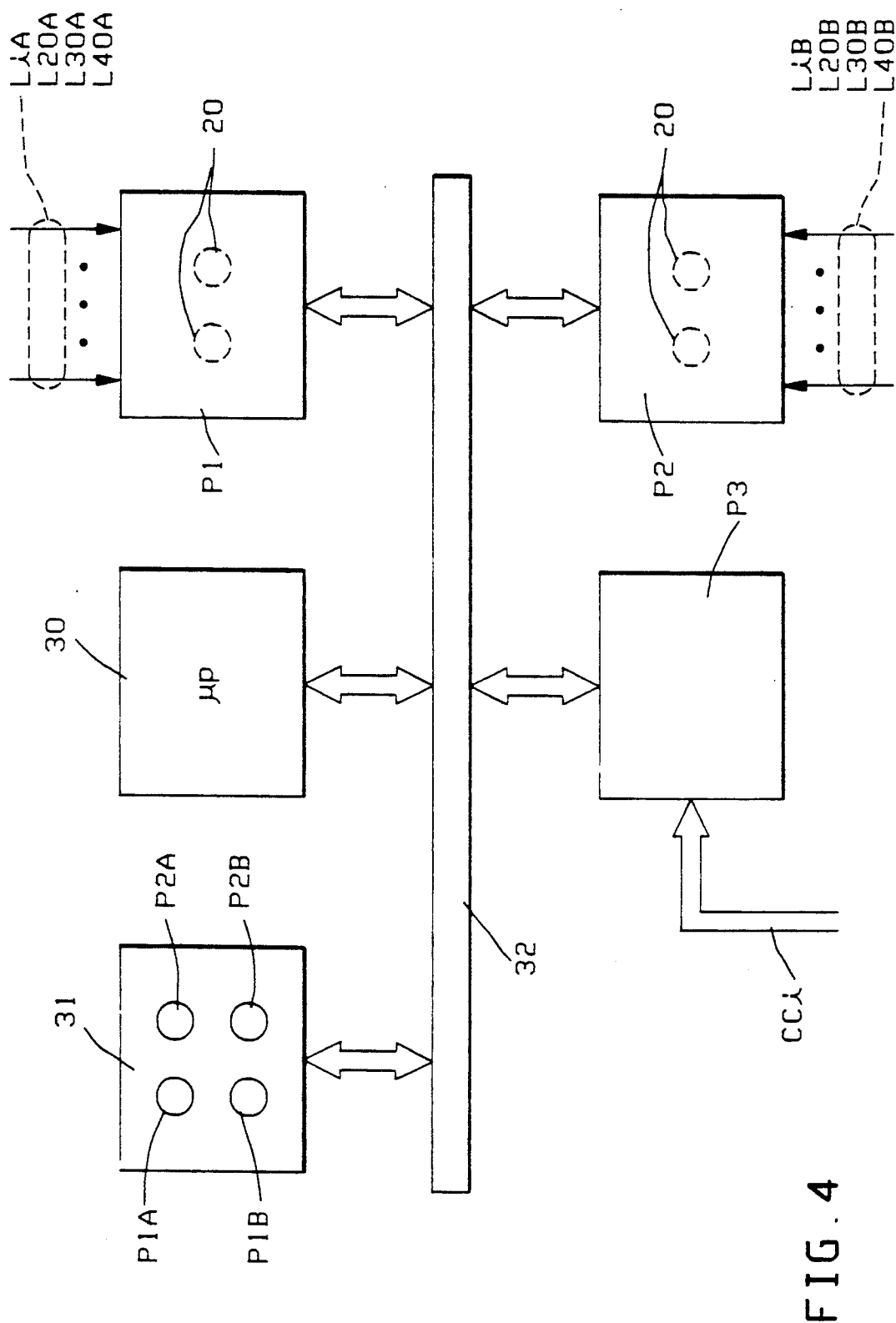
FIG. 4 shows the overall architecture of the FIG. 1 communication module in which the FIG. 3 inter-processor command decoder is included; and, FIG. 5 is a detailed logic diagram of another command decoder which is an alternative to the command decoder of FIG. 3.

After the inter-processor command IPC-XA is detected within a communications module, that module then interprets the command and performs whatever tasks the command specifies. And, one preferred architecture for the communications module which is flexible and accommodates any command interpretation and task execution is shown in FIG. 4. This FIG. 4 communication module consists of the three ports P1, P2, and P3 plus a microprocessor 30 and a memory 31, all of which are intercoupled as shown over a time shared bus 32.

In each of the ports P1 and P2, a separate copy of the FIG. 3 two-stage command decoder 20 is included for each inter-processor command that is to be received. All that changes in each copy is the particular code and its compliment which are detected by the components 22A and 23A. Those command decoders then have their outputs latched and synchronized with the time shared bus 32 via standard bus control circuits (not shown) that exist within the ports P1 and P2.

When a particular inter-processor command is detected by one of the two stage command decoders 20, a signal which identifies that command is sent from the decoder 20 via the bus 32 to the microprocessor 30. In response, the microprocessor executes a separate program P1A, P1B, . . . for each particular inter-processor command received on port P1, and it executes a separate program P2A, P2B . . . for each inter-processor command received on port P2. By these programs, the microprocessor 30 sends control signals over the bus 32 to the port that is opposite to the one which received the inter-processor command. Then, the circuitry in that opposite port responds to the control signals in some predetermined fashion.

For example, in response to the control signals from the microprocessor 30, the control port can stop transferring any data to or from the communications port P3. Also, in response to the control signals from the microprocessor 30, a control port can signal the computers A or B via the busses L40A or L40B that certain action is required on its part.

One preferred embodiment of the invention has now been described in detail. In addition however, various changes and modifications can be made to the details of this embodiment without departing from the nature and spirit of the invention. For example, FIG. 5 shows an alternative to the two-stage command decoder of FIG. 3.

Figure 5:
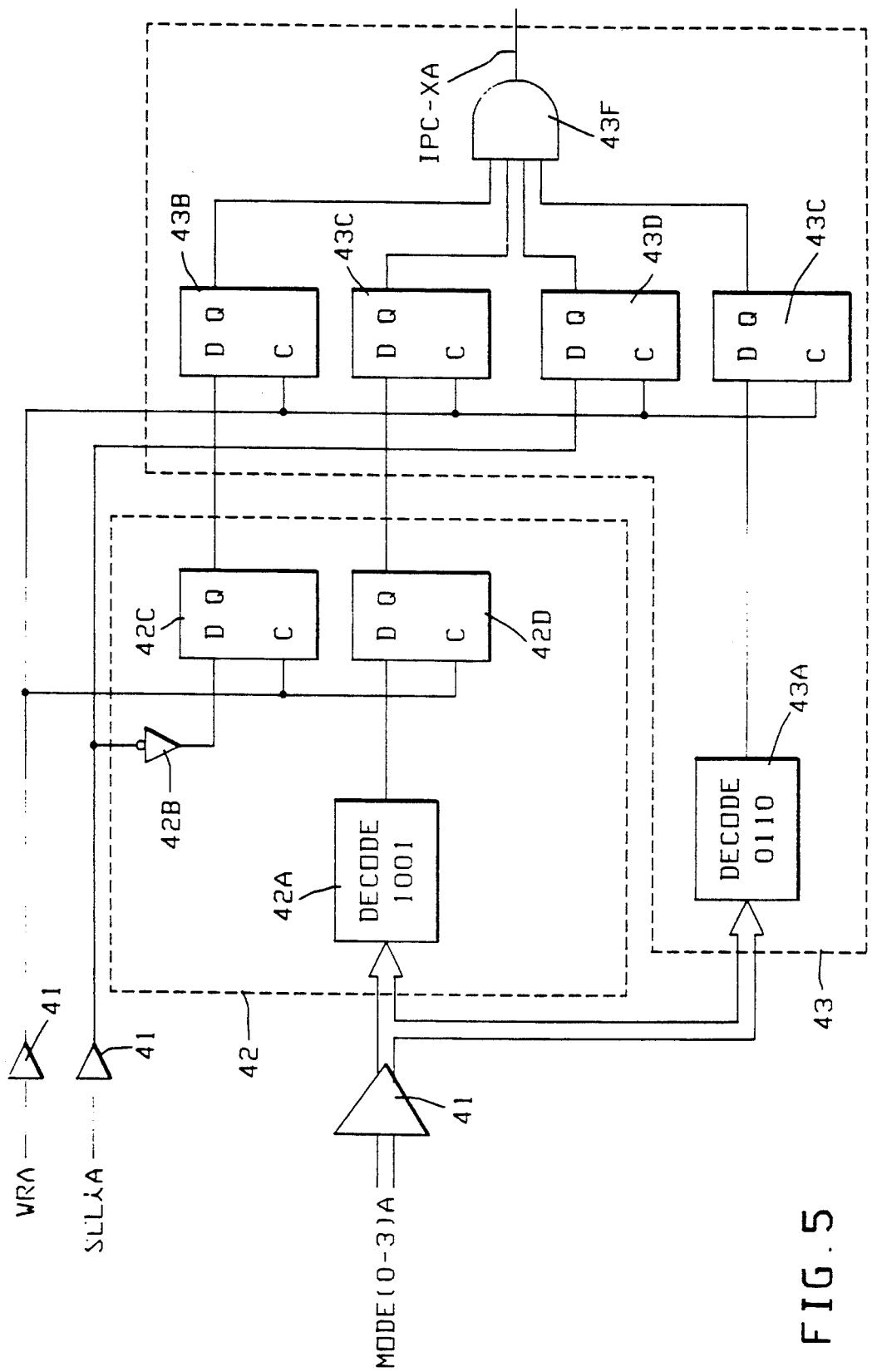

This FIG. 5 command decoder consists of a set of receivers 41, a lead stage 42, and a trail stage 43. Stage 42 includes a logic circuit 42A, an inverter 42B, and two triggerable D flip-flops 42C and 42D; and, stage 43 includes a logic circuit 43A, four triggerable D flip-flops 43B–43E, and an AND gate 43F. All of these components 41, 42A–42D, and 43A–43F are interconnected as shown; and, the input signals to the receivers 41 are again shown for control port P1 on the ith communication module, as an example.

In operation, component 42A detects the presence, of a particular predetermined code (e.g. 1001) on the mode lines and the occurrence of that code at time instant t2 as indicated by the set state of flip-flop 42D. Likewise, inverter 42B detects the "0" state of the ith select signal; and, the occurrence of that "0" state at time instant t2 is indicated by the set state of flip-flop 42C.

If flip-flop 42C gets set at time instant t2, then flip-flop 43B will get set at time instant t4. Likewise, if flip-flop 42D gets set at time instant t2, then flip-flop 43C will get set at time instant t4. Also, flip-flop 43D will set at time instant t4 if the ith select signal is in a "1" state, and flip-flop 43E will set at time instant t4 if the mode signals are the compliment of the code that is detected by component 42A. Thus, by ANDing the output of all of the flip-flops 43B–43E via AND gate 43F, the occurrence of an inter-processor command is detected.

In comparing the FIG. 5 command decoder to the FIG. 3 command decoder, it is seen that both stages of the FIG. 5 decoder contain multiple flip-flops whereas both stages of the FIG. 3 decoder only contain a single flip-flop; and, as another modification, these two command decoder circuits can be changed such that the number of flip-flops in either stage is one or more. For example, the lead stage 22 of FIG. 3 can be used in combination with the trail stage 43 of FIG. 5 by coupling the output of flip-flop 22D to the D input of flip-flop 43C and eliminating flip-flop 43B. Also, the trail stage 23 of FIG. 3 can be used in combination with the lead stage 42 of FIG. 5 by making AND gate 23B a four input gate and coupling the outputs of flip-flops 42C and 42D to that AND gate.

Further, in the FIG. 5 trail stage 43, the number of flip-flops can be reduced to three or two. Flip-flop 43D can be eliminated if a two input AND gate is inserted between the decoder 43A and flip-flop 43E and the D input signal to flip-flop 43D is sent to the second input to that AND gate. Similarly, flip-flop 43C can be eliminated if a two input AND gate is inserted between flip-flops 42C and 43B and the D input signal to flip-flop 43C is sent to the second input to that AND gate.

Also, the FIG. 3 command decoder can be modified by breaking the enable connection "EN" between the lead stage 22 and the trail stage 23, and by sending both the enable signal EN and the trail stage output IPC-XA to microprocessor 30 of the FIG. 4 communication module as an indication of an inter-processor command. This implementation is, however, not preferred since by breaking the lead stage - trail stage connection, the distinction of which stage set before the other stage is lost.

Also in the FIG. 1 computer system, the computers A and B can be any particular model from any manufacturer, so long as they are adapted to interface with the select lines L1–L16, mode lines L20, and write line L30 as previously described. Similarly, the microprocessor 30 in the FIG. 4 communications module can be any commercially available microprocessor such as a Motorola 68000 series microprocessor or an INTEL 80/X86 series microprocessor. Likewise, the port P3 of the communications module can be configured internally to operate with any type of communication channel, some examples of which are: an RS232 channel, a token ring channel of a local area network, a slotted time shared voice and data channel, etc. In addition, a single communication module can be coupled to more than one communications channel. This can be achieved with the FIG. 4 communications module, for example, by providing a separate port P3 on the bus 32 for each communication channel. Further, to detect an intra-processor command from the computers A and B, the control ports P1 and P2 can include various circuits such as just the trail stage 23 of the FIG. 3 inter-processor command decoder in which the enable input EN is removed from AND gate 23B.

Accordingly, since many variations can be made to the details of the illustrated preferred embodiments of the invention, it is to be understood that the invention is not limited to those details but is defined by the appended claims.

What is claimed is:

1. A communications module, comprising:
   two control ports for receiving commands from two computers, and a communication port for transferring data over a communication channel in response to said commands;
   each of said control ports including a select line which carries a select signal with true and false states, mode lines which carry codes, and a write line which carries a respective pulse in sync with each of said codes;
   each control port having its select line, mode lines, and write line coupled to a separate intra-processor command decoder and a separate inter-processor command decoder for that port;
   each intra-processor command decoder having only a single stage which generates an output signal that indicates the receipt of an intra-processor command for said module if, during any one of said pulses, a first multi-bit code occurs on said mode lines and said select line is true;
   each inter-processor command decoder having a lead stage which signals when a second multi-bit code occurs on said mode lines and said select signal is false during a first one of said pulses; and, having a trial state coupled to said lead stage, which generates an output signal that indicates the receipt of an inter-processor command if, during a second pulse that immediately follows said lead stage signal, the compliment of said second code occurs on said mode lines and said select line is true.

2. A module according to claim 1 wherein said lead stage includes a single flip-flop which sets when said predetermined code occurs and said select signal is false during said first pulse, and said trail stage includes a single flip-flop which sets when the compliment of said predetermined code occurs and said select signal is true during said second pulse.

3. A module according to claim 1 wherein said lead stage includes a single flip-flop which sets when said predetermined code occurs and said select signal is false during said first pulse, and said trail stage includes multiple flip-flops which set when the compliment of said predetermined code occurs and said select signal is true during said second pulse.

4. A module according to claim 1 wherein said lead stage includes multiple flip-flops which set when said predetermined code occurs and said select signal is false during said first pulse, and said trail stage includes a single flip-flop which sets when the compliment of said predetermined code occurs and said select signal is true during said second pulse.

5. A module according to claim 1 wherein said lead stage includes multiple flip-flops which set when said predetermined code occurs and said select signal is false during said first pulse, and said trail stage includes multiple flip-flops which set when the compliment of said predetermined code occurs and said select signal is true during said second pulse.

6. A module according to claim 1 wherein each control port exchanges data with said communication port; and wherein said module further includes a microprocessor, coupled to one inter-processor command decoder of one control port, that responds to the output signal from said one decoder by stopping the transfer of any data on the opposite control port.

7. A module according to claim 1 which further includes a microprocessor, coupled to one inter-processor command decoder of one control port, that responds to the output signal from said one decoder by signaling the computer on the opposite control port to perform a predetermined action.

8. A module according to claim 1 wherein at least one of said control ports includes multiple inter-processing command decoders, each of which has a lead stage that detects a different multi-bit code that differs by at least one bit, and a trail stage that detects the compliment code wherein each bit is inverted.

9. A command decoder module, comprising:

a single stage decoder and a dual stage decoder, both of which are coupled in parallel - a) a select line which carries a select signal with true and false states, b) mode lines which carry codes, and c) a write line which carries a respective pulse in sync with each of said codes;

said single stage decoder consisting of one stage which generates an output signal that indicates the receipt of a first command if, during any one of said pulses, a first multi-bit code occurs on said mode lines and said select line is true;

said dual stage decoder including a lead stage which signals when a second multi-bit code occurs on said mode lines and said select signal is false during a first one of said pulses; and, said dual stage decoder further including a trial stage, coupled to said lead stage, which generates an output signal that indicates the receipt of a second command if, during a second pulse that immediately follows said lead stage signal, the complement of said second code occurs on said mode lines and said select line is true.

* * * * *